Figure 1:
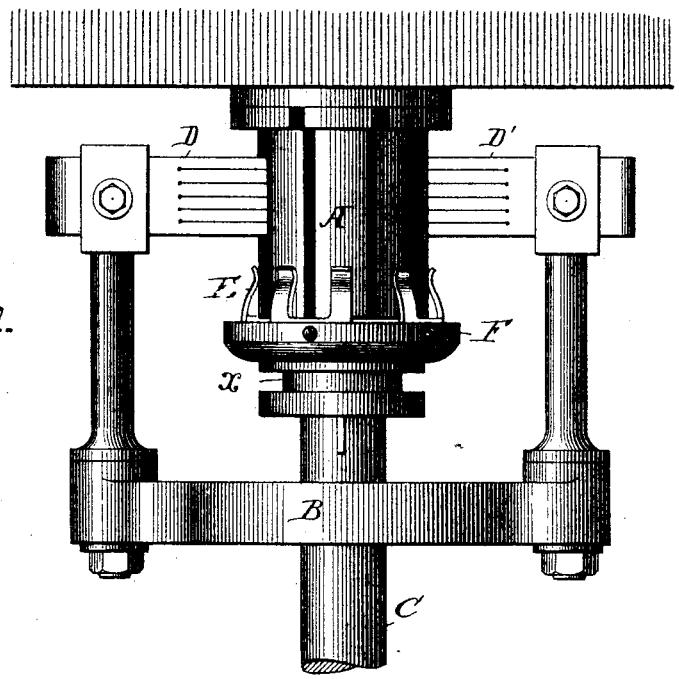

(No Model.) 3 Sheets—Sheet 1.

N. P. OTIS & R. C. SMITH.
ELECTRIC MOTOR.

No. 458,976. Patented Sept. 1, 1891.

WITNESSES
Jno. G. Hinkel
H. S. McArthur

INVENTORS
N. P. Otis
R. C. Smith
by Foster & Freeman
Attorneys (No Model.) 3 Sheets—Sheet 2.
N. P. OTIS & R. C. SMITH.
ELECTRIC MOTOR.
No. 458,976. Patented Sept. 1, 1891.
Fig. 3.
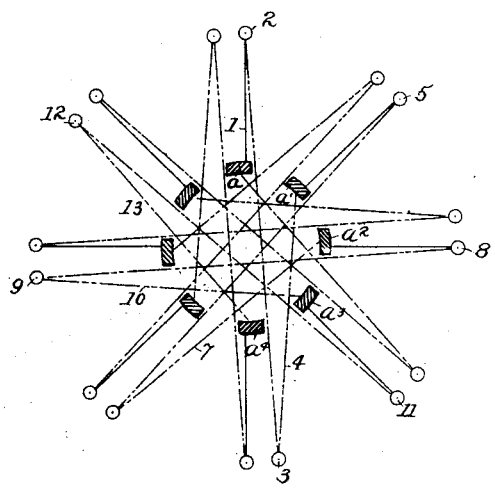
Fig. 4.
Fig. 6.
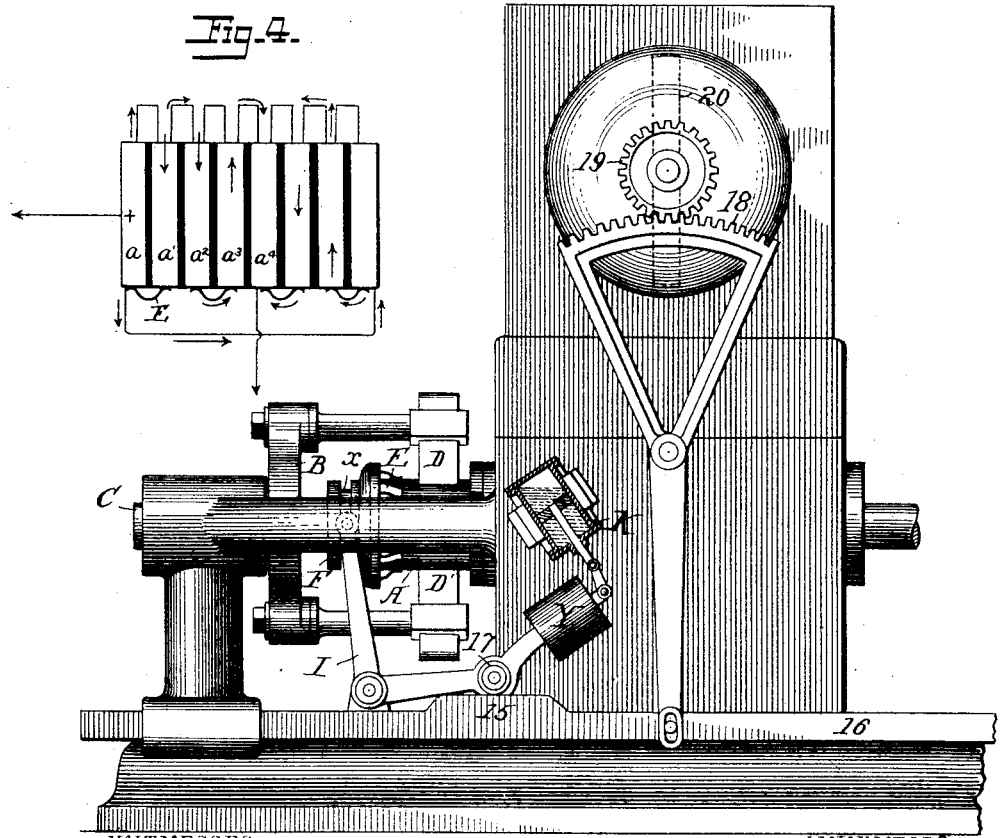
WITNESSES
Jno. G. Hinkel.
H. S. McArthur.
INVENTORS
N. P. Otis
R. C. Smith
by Foster & Freeman
Attorneys (No Model.) 3 Sheets—Sheet 3.
N. P. OTIS & R. C. SMITH.
ELECTRIC MOTOR.
No. 458,976. Patented Sept. 1, 1891.
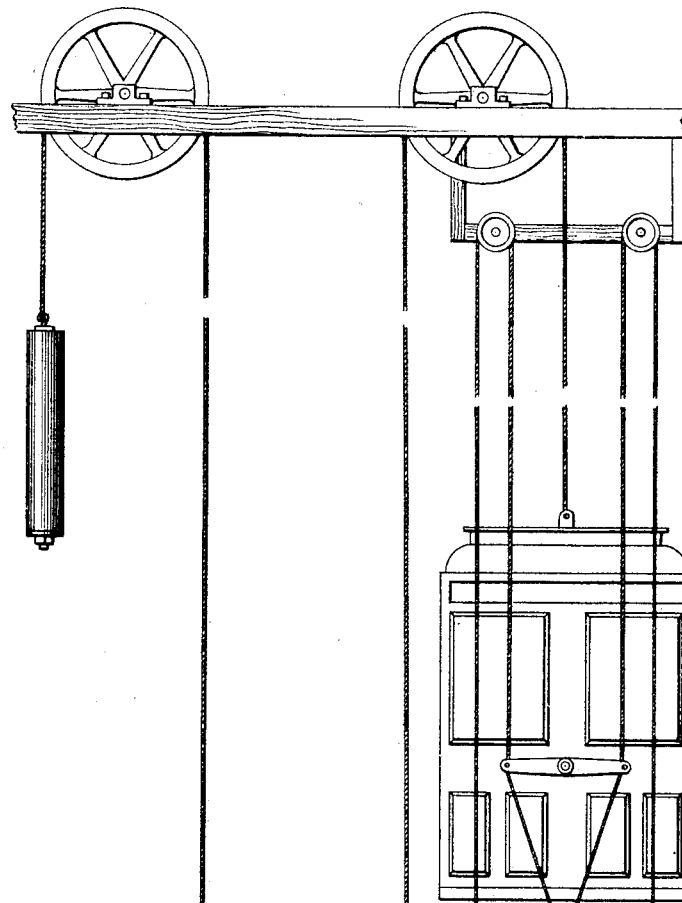
Fig. 5.
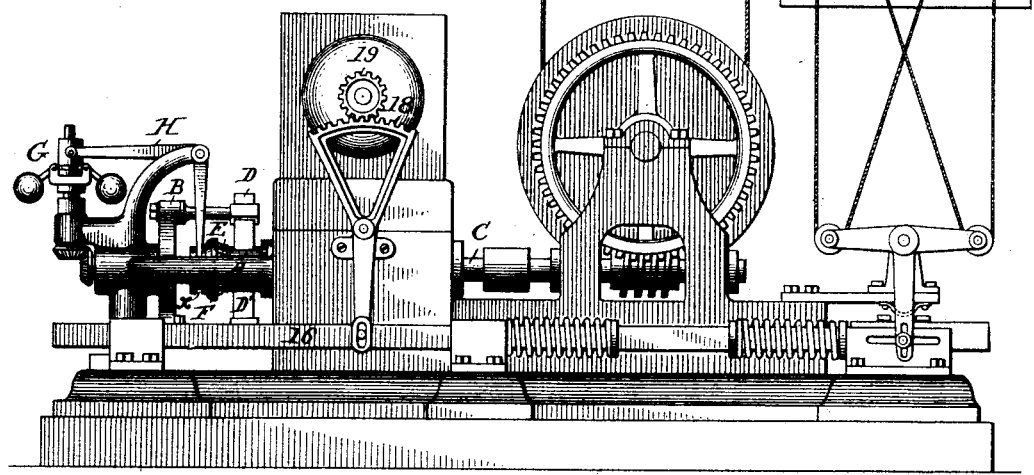
WITNESSES
Jno. G. Hinkel,
W. S. McArthur
INVENTORS
N. P. Otis
R. C. Smith
by Foster & Freeman
Attorneys

UNITED STATES PATENT OFFICE.

NORTON P. OTIS AND RUDOLPH C. SMITH, OF YONKERS; SAID SMITH ASSIGNOR TO THE OTIS BROTHERS & COMPANY, OF NEW YORK, N. Y.

ELECTRIC MOTOR.

SPECIFICATION forming part of Letters Patent No. 458,976, dated September 1, 1891.

Application filed July 31, 1890. Serial No. 360,461. (No model.)

*To all whom it may concern:*

Be it known that we, NORTON P. OTIS and RUDOLPH C. SMITH, citizens of the United States, residing at Yonkers, Westchester county, State of New York, have invented certain new and useful Improvements in Electric Motors, of which the following is a specification.

Our invention relates to a method of and apparatus for starting and controlling electric motors and more especially motors which are used to transmit motion to machinery for the transportation of goods and passengers, and which are necessarily obliged to be stopped and started quite often in their operation.

In the operation of electric motors, as well as other motors, it is well known that surplus of power is necessary to overcome the friction of rest and the inertia of the mass, and for such purpose more power is needed than is required to run the motor after it has attained its proper speed of rotation. This starting power or torque is especially limited in electric motors driven from a source of constant current, for as soon as such a motor is loaded to its full capacity or to the margin to which the generator at the source can be regulated an increase of pulling power cannot be obtained, as the current cannot be increased. It therefore becomes necessary to provide some method and means at the motor whereby the constant current can be utilized to produce the increased power required at the time of starting.

It is well known that the power of a motor, or what may be termed the "torque" or "turning moment" of the motor, depends on the strength of the magnetic field, on the number of windings on the armature, and on the strength of the current, and the power of the motor can be varied by changing any one or more of these elements and by properly proportioning and altering their relations to each other. In the use of a motor in a constant-current circuit of course the strength of the current cannot be varied, and if the strength of the magnetic field is varied, as has been proposed by others, and it is arranged to give a greater torque or pull than is required for normally running a motor of larger size or a greater number of field-windings is necessary, resulting in the use of an undue amount of iron and copper and deficient electrical conditions for the best and most effective operation of the motor under normal conditions. It is desirable, in order that the motor may show its greatest efficiency under normal conditions, to use a powerful magnetic field with a small number of armature windings or turns, and if the powerful field can only be used at the moment of starting and has to be lessened or weakened for normal conditions it is apparent that an efficient motor is not produced.

The object of our invention is to provide a motor for use in constant-current circuits in which the strength of the magnetic field may remain practically unchanged, and in which the necessary starting-power or torque may be produced to the best advantage and the motor started under load and run without danger of exceeding the margin of regulation of the generator or the heating limit when such a motor is used on a constant-potential circuit.

In carrying out our invention we arrange the motor in the manner hereinafter more fully described, so that it will have at the starting moment or moment of torque a greater number of effective windings or turns on its armature than is needed for normal running, and will thereby produce the necessary counter electro-motive force with a less number of revolutions than its normal speed, and thereby keep the product of force and the distance moved through (or work done) the same when starting as when running normally with less torque and more revolutions. Thus the motor is started and the armature is rotated as if wound for a less number of revolutions than its normal speed, and mechanical and electrical devices are provided, whereby after the motor is started the number of effective windings or armature turns is reduced to that required for running at its normal speed and power.

Figure 2:
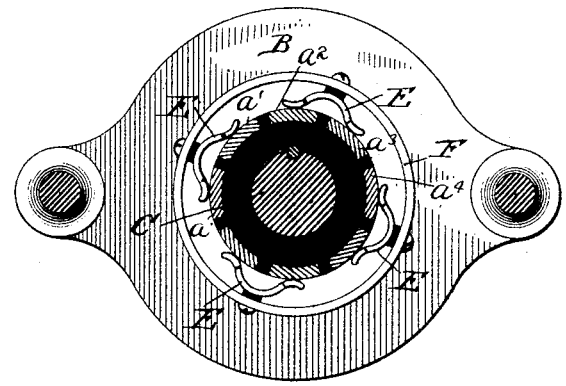

In the accompanying drawings, Figure 1 is a plan view showing a part of the motor embodying one of the means of carrying out our invention, in which are shown the commutator-bars, brushes, and brush-holder and means for coupling or joining in pairs or otherwise some of the commutator-bars, whereby the number of effective windings or armature turns may be varied. Fig. 2 is a transverse section of the commutator and couplers. Fig. 3 is a diagrammatic view illustrating a Siemens winding. Fig. 4 is a diagrammatic view of the commutator shown in Fig. 3, with one arrangement of the couplings. Fig. 5 is a side elevation showing sufficient of an electric motor adapted for elevator purposes to illustrate our improvement, provided with means for automatically shifting the coupler. Fig. 6 is a similar elevation showing another embodiment of our invention.

Referring to Figs. 1 and 2, A represents the commutator of a motor having a number of commutator-plates $a$ $a'$ $a^2$ $a^3$, to which the terminals of the windings are connected in the usual manner, and for the purposes of illustrating our invention we have indicated in Fig. 3 one well-known form of connecting the terminals to the commutator-strips.

B is the brush-holder mounted on the shaft C, carrying brushes D D'.

Some means must be provided by which some of the windings or coils can be short-circuited to render them ineffective, and in the present instance we have shown what we term a "coupler" E, which is mounted upon a coupler-head F, sliding upon the shaft C. These couplers are in the form of U-shaped spring-metal pieces fixed to the coupler-head, but insulated therefrom, and so arranged that when the head is thrown toward the commutator-bars the forks or fingers of each coupler will make contact with two adjacent bars, as $a$ $a'$ $a^2$ $a^3$, &c., and connect the said bars electrically, so that they form practically a single bar, thereby short-circuiting the winding of the armature included between the said pairs of bars and reducing the number of effective windings on the armature. In the present instance we have shown four couplers connected to the coupler head and operating to render ineffective one-half of the windings of the armature; but of course it will be understood that they may be arranged to render ineffective any one or more of the windings, as the case may be. The operation of this arrangement of devices will be understood by reference to Fig. 4, wherein the commutator is shown displayed and the coils are wound as illustrated in Fig. 3. Starting, for instance, at the commutator-plate $a$, the conductor 1 passes over the surface of the armature-core through the conductor 2, returning at 3, and thence passes by the wire 4 to the plate $a'$, thence by the wire 5 around the core back by the wire 6 and 7 to the plate $a^2$, thence by the wire 8, 9, and 10 to the plate $a^3$, and thence by the wire 11, 12, and 13 to the plate $a^4$, and so on, in the usual manner. The brushes are supposed to be placed upon the plates $a$ $a^4$, and under normal conditions and at starting the current passes through each of these coils in series from one brush to the other, so that the whole number of armature windings is rendered effective to overcome the friction at starting, and the inertia of the parts and the force exerted, the current and strength of the field-magnets being normal is proportional to the number of ineffective windings included in the circuit. When, however, the requisite speed and power of the armature has been acquired and it is generating the proper amount of counter electro-motive force, some of these coils are short-circuited and rendered ineffective, and this is accomplished by bringing the coupler into action, and when it is arranged as heretofore described, and as illustrated in Fig. 4, it will render ineffective one-half of the coils or windings of the armature and the main portion of the current will follow the course clearly indicated in Fig. 4, while a small portion only of the current will pass through the ineffective coils, and under these conditions the motor will rotate at its normal speed and produce the required power.

Any desired means may be employed for shifting the coupler. Thus in Fig. 5 the same is shown in connection with an ordinary ball-governor G and crank-lever H engaging with the sleeve of the governor and with the annular recess $x$ in the coupler-head, so that after starting the governor, as it acquires its maximum speed, throws in the lower arm of the lever and shifts the head so as to couple the bars.

In the construction shown in Fig. 6 the lever I, instead of being connected with the governor, has at its outer end a weight Y and is connected with the piston of a dash-pot or cataract K, and a projection 15 upon the shipper-bar 16 has inclined ends which ride under a stud 17 on the lever. A segmental lever 18 is connected with the shifter-bar and gears with the pinion 19 on the usual switch 20, by means of which the current to the motor from the main line is controlled. As shown in Fig. 6, the parts are in mid-position with the current cut-off and the coupler thrown back so as to afford the full number of effective conductors for starting. When the shipper-bar is thrown in either direction to start the motor, the projection 15 passes from below the lug 17, but the lever I does not at once descend, so that the machine is fully started before the coupler-head F has been shifted sufficiently to bring the couplers in contact with the bars of the commutator, which results as the piston of the dash-pot gradually descends.

What we claim is—

1. The method of starting and operating electric motors, which consists in passing the current through all the coils of the armature to render them effective on starting, and subsequently short-circuiting a portion of the coils to render the current passing through them ineffective when the motor is under normal speed, substantially as described.

2. The combination, with the armature of a motor, of a short-circuiting device for rendering some of the coils of the armature ineffective, substantially as described.

3. The combination, with the armature of a motor, of an automatic short-circuiting device for rendering some of the coils of the armature ineffective, substantially as described.

4. The combination, with an armature of a motor and the commutator thereof, of a short-circuiting device for short-circuiting some of the commutator-bars, rendering the coils connected thereto ineffective, substantially as described.

5. The combination, with the armature of a motor and its commutator, of a coupling device arranged to couple some of the commutator-bars and short-circuit the current through the coupler, substantially as described.

6. The combination, with the armature-shaft and commutator thereon, of a coupler-head sliding on said shaft carrying couplers arranged to engage and disengage said commutator-bars, substantially as described.

7. The combination, with the armature-shaft and commutator thereon, of a coupler-head mounted on said shaft, carrying couplers engaging the commutator-bars, and automatic means for moving said coupler-head, substantially as described.

8. The combination, with the armature-shaft of a motor and commutator thereon, of a coupler engaging the commutator-bars, a switch controlling the circuit of the motor, and connections between the switch and coupler, whereby the coupler will be operated automatically on the operation of the switch, substantially as described.

9. The combination, with the armature-shaft of a motor and commutator thereon, of a coupler engaging the commutator-bars, a switch controlling the circuits of the motor, means for operating the switch, and a retarding device for delaying the movements of the coupler, substantially as described.

In testimony whereof we have signed our names to this specification in the presence of two subscribing witnesses.

NORTON P. OTIS.
RUDOLPH C. SMITH.

Witnesses:
JOHN P. WOODRUFF,
HENRY L. BRANT.